Dec. 19, 1933.                 C. E. BRACKBILL                 1,939,873
                       LIQUID SAMPLING AND TESTING DEVICE
                              Filed March 4, 1932
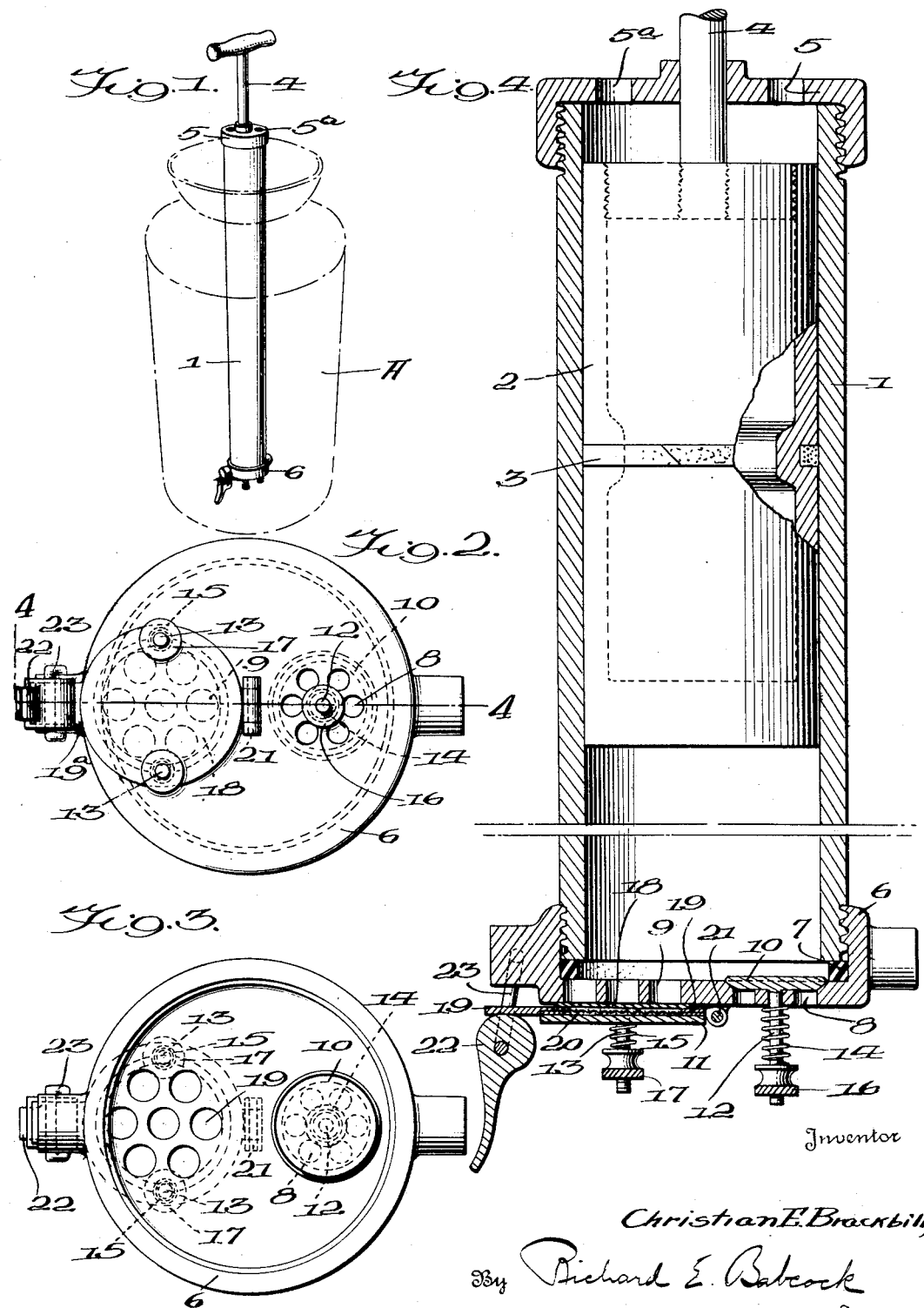

Patented Dec. 19, 1933

1,939,873

UNITED STATES PATENT OFFICE 1,939,873

LIQUID SAMPLING AND TESTING DEVICE

Christian E. Brackbill, Kinzers, Pa.

Application March 4, 1932. Serial No. 596,850

7 Claims. (Cl. 137—18)

This invention relates to liquid sampling and testing devices and has primarily in view the sampling of milk and the testing thereof for dirt or sediment.

In connection with the operation of milk receiving or cooling stations, in personal dealings with the dairy farmers who bring their milk to such stations it is not infrequently desirable to demonstrate to a particular dairy farmer the fact that his milk is too dirty or contains too much sedimentary matter. To do this heretofore it has been usual to pour off nearly all of the milk, leaving the milk in the bottom of the can to be separately poured through a strainer provided with a cloth or other filter which filters out the dirt or sediment to visually demonstrate to the dairy farmer the objectionable condition in which his milk was received. This involves the handling of heavy cans, the time of one or more employees and the use of extra receptacles, and the slow process of waiting for the sample of milk to drain by gravity through a relatively small discharge opening, and also has the disadvantage that unless the milk can is handled carefully the milk is apt to be stirred up and the sedimentary mattery dispersed throughout the contents of the can, with the result that it is not practical to obtain a fair sample demonstrating the real condition of the milk.

The present invention has been developed with the above considerations in view and has for its primary object to provide a device which may be thrust down into a can of milk and immersed in the milk therein to any desired point to take a sample of milk at any level or point of the can and may be then operated, either in said can of milk or after withdrawal therefrom, to eject the sample so taken through a straining or filtering element to separate the sedimentary matter contained in said sample; to provide in such a device opposed yieldingly held valves controlling the inlet and outlet ports, whereby the outlet port will be closed while the sample is being taken and the inlet port will be closed while the sample is being filtered; to provide releasable means for holding the filtering element, pad or disc in operative position whereby said filtering element may be easily and quickly removed for purposes of inspection; to provide a special hinged screen member for retaining the filtering element in position in combination with a flap or disc valve mounted on said retaining means to swing therewith about the pivot of the latter and yieldingly pressed toward the latter; to provide a device of this type of such construction that all parts may be quickly separated so as to give the greatest degree of accessability to all surfaces during washing or cleaning, and to provide a device for the purpose and of such construction as to easily lend itself to economical manufacture and to large quantity production operations.

In this application I show and describe only the present preferred embodiment of my invention simply by way of illustration of the practice thereof, as by law required. However, I am aware that my invention is capable of other and different embodiments and that the several details thereof may be modified in a number of different ways, all without departing from my said invention. Therefore, the drawing and description herein are to be considered as merely illustrative and not as exclusive.

In the accompanying drawing:

Figure 1 represents a perspective view of the device embodying my invention as immersed in the milk in a can A for taking a sample of milk from the bottom portion of the milk contained therein;

Figure 2, a bottom plan view of said device, drawn to full-size scale;

Figure 3, a top plan view of the lower end element 6 and parts carried thereby; and Figure 4, a vertical section, broken away, on the line 4—4 of Figure 2.

Referring now in detail to the drawing, 1 indicates the cylindrical barrel slidably receiving the reciprocal pump plunger or piston 2 which makes a snug sliding fit therein and preferably is provided with an annular cord, rope or other textile or paper or the like packing 3, which is disposed in an annular groove in said piston 2 and in operation presses against the opposed cylindrical wall of the barrel 1 to make a tight fit therewith. Said packing is to be split or of such other construction that it may be easily applied and removed, to the end that a fresh packing may be applied each day or at such other time intervals or in accordance with such other conditions as may from time to time be prescribed or required by the officials having these matters in control. The barrel 1 will preferably be about two feet long, that is to say it will preferably be of such length that when inserted in the average dairy milk can to such degree that its lower end is practically touching the bottom of said milk can, its upper end will extend beyond the surface of the milk in said can, when full, so that said upper portion may be gripped by the operator's hand above said milk surface, and said piston or plunger 2 will preferably be of considerable length, such as to effectually guard against any canting or rocking motion of the plunger or piston 2 and such as will efficiently contribute to eliminating the seepage of milk between the opposed faces of said barrel 1 and piston 2. In the embodiment illustrated, the barrel 1 has an internal diameter of two inches and a length of two feet, and the piston or plunger 2 is of such diameter as to make a snug sliding fit therein and is five inches in length.

The external end portions of the barrel 1 are externally screw-threaded to respectively receive the internally screw-threaded upper end or cap 5 and the lower end member 6, and an operating stem, handle or rod 4 extending through a central perforation in the top end 5 and having its lower end portion externally screw-threaded, engages in a cooperating internally screw-threaded bore in the center of the upper end of the plunger or piston 2, thus providing means whereby the plunger 2 may be reciprocated in the barrel 1. Preferably the handle or rod 4 will be provided on its upper end with a hand grip as illustrated in Figure 1.

Preferably a rubber ring 7 or other suitable packing means will be interposed between the lower end of the barrel 1 and the opposed face of the lower end member 6 so as to make a liquid-tight joint at this point, although this is not essential, and for that matter the joint may be made liquid-tight by properly grinding and forming the opposed metal surfaces.

The lower end member 6 is formed with the intake port 8 and the outlet port 9 respectively controlled by the inwardly opening conical valve 10 and the outwardly opening disc valve 11. The inlet valve 10 has an outwardly extending stem 12 projecting through, and guided by, the hub of the spider formed by the plurality of perforations making up the inlet port 8 and receives on its lower end an adjusting nut 16, a helical spring 14 being disposed about said stem between the opposed faces of said hub and said nut 16 and having its respective ends in engagement therewith, whereby adjustment of said nut 16 on said stem 12 will serve to adjust the compression of said spring 14.

The disc valve 11 is perforated at diametrically opposite points of its outer portion to receive two studs 13 rigid with and depending downward from the plate 19 and having their lower end portions screw-threaded to receive adjusting nuts 17, helical springs 15 disposed about said stems 13 respectively and engaging with their upper ends the disc valve 11 and with their lower faces the adjacent faces of said nuts 17, serve to press said disc valve 11 against the plate 19 and said nuts 17 may be adjusted to adjust the pressure of said springs 15 as desired. Preferably the opposing faces of said disc valve 11 and said plate 19 will be ground to make a ground joint as nearly liquid-tight as practical to a device of this nature.

The plate 19 will be movably mounted with relation to the end member 6, preferably by means of a hinge 21 so as to be swingable toward and from the discharge port 9, and will be provided with a perforate, preferably screen wire portion 20, lying well inside of the radially outer portions of the disc valve 11 and preferably substantially registering in a vertical direction with the outer walls of the outer perforations of the discharge port 9, and a cotton pad or disc or textile disc or other filtering element 18 will be interposed between the lower face of the lower member 6 and the upper face of the plate 19 in such position as to extend over all of the perforations of the discharge port and to have its radially outer or marginal portion clamped substantially and preferably at all points by the plate 19 against the adjacent portion of the lower face of the end member 6, said plate 19 having a finger or tongue 19ª adapted to be engaged by a cam lever 22 pivotally carried by the link 23 swingably mounted on the end member 6, although of course it will be understood that any other known means for clamping the plate 19 against the lower face of the end member 6 and the intervening filter pad 18 may be employed.

With a device constructed and assembled as above and with a fresh filter pad or element 18 clamped in position between the plate 19 and the end element 6 and covering the discharge port 9 and held against distention by the perforate portion or screen wire 20 of the plate 19, in order to take and test a sample of milk, the plunger 2 will first be shoved down to the lower end of the barrel 1 by the handle 4, next the lower end of the device will be immersed in the milk in a given can to the desired point in said can, for instance to a point closely adjacent the bottom of said can, next the plunger or piston 2 will be retracted to drawn in a sample of milk through the inlet port 8, the valve 10 opening under the suction of the plunger 2 and the valve 11 being held against its seat by its springs 15 and also by such suction. When the amount of milk desired as a sample has been drawn into the barrel 1, the device may be withdrawn from the particular can of milk and the sample of milk may be then discharged into any desired receptacle through the discharge port 9 by moving the piston 2 toward the end element 6, and thereafter the cam lever 22 together with its link 23 will be operated to release the finger 19ª of plate 19, which will then be swung on its hinge 21 so as to permit the withdrawal of filter pad 18 for examination as to sediment deposit.

It is not necessary to remove the device from a particular can of milk after a sample of milk has been taken and before the sample has been discharged, but said sample may be immediately discharged directly in the body of milk in said can and the device thereafter removed and the filtering pad 18 thereafter removed for purposes of inspection, although in such case it is evident that the discharge of the milk would result in agitating the milk in said can and a further sample could not be again taken from said can until sufficient time had elapsed for sedimentary matter to again settle.

While in the preferred embodiment illustrated the body or cylindrical portion 1 of the barrel, the lower end member 6, and the upper end member 5 have been shown as separate elements to be of course associated together in the operative condition of the device, and to be easily and quickly separated for purposes of cleaning, and while this is the preferred construction, this construction is not essential, it is not essential that any top member 5 be provided, and it is not essential that the lower member 6 shall not be integral with, or separable from, the body member 1 of the barrel. Operatively considered, the lower member 6 is a part of the barrel, serving to close the lower end thereof, so that the lower portion thereof may serve as a suction and a compression chamber, and broadly considered is a mere matter of preference as to whether the bottom end member 6 and the body 1 of the barrel be made separable as illustrated.

If a top member 5 is employed it will be preferably perforated as at 5ª to avoid the possible generation of a vacuum or suction in the upper portion of the body 1 between the member 5 and the plunger or piston 2 and to permit the easy and rapid expelling of any air or liquid that may accumulate in the upper part of the body 1 between the member 5 and the piston or plunger 2.

It is of no particular importance whether the intake and discharge ports be formed in the lower end member 6, so long as some intake and discharge ports are provided establishing communication between the lower end portion of the interior of he barrel and the space surrounding the exterior thereof, nor is it of any great consequence whether the intake valve 10 and the discharge valve 11 and associated parts be mounted on the lower end member 6, it sufficing if said valves be so mounted as to control their respective ports and to so function as to properly regulate the intake and discharge of liquid through said ports.

Nor is it of importance that the type and construction of valve 11 be adhered to, so long as some valve functioning to properly control the discharge port 9 and permitting the discharge of liquid therethrough under pressure is provided.

Having thus described my invention, what I claim is:

1. A liquid sampling and testing device comprising a barrel and a piston disposed for reciprocation in said barrel, said barrel having its lower end closed and being formed with normally closed intake and discharge ports, in combination with an inwardly opening intake valve controlling and normally closing said intake port, yielding means for holding said intake valve in normal position, a plate having a perforated portion and adapted to be held against the lower face of said barrel with the perforated portion of said plate in registry with the outer end of the discharge port of said barrel, said plate being adapted to clamp to said barrel a filtering pad adapted to be inserted between the opposing faces of said barrel and said plate, releasable means for clamping said plate against said barrel, a disc valve extending in all directions beyond the perforated portion of said plate and adapted to make a substantially liquid-tight contact at all points therewith about said perforated portion, means connected with said plate for limiting the movement of said disc valve with relation to said plate, and yieldable means normally pressing said disc valve against said plate and being adapted to yield to pressure exerted on the liquid by said piston.

2. A liquid sampling and testing device comprising a barrel, and a piston disposed for reciprocation in said barrel, said barrel having its lower end closed and being formed with normally closed intake and discharge ports, in combination with an inwardly opening intake valve controlling and normally closing said intake port, yielding means for holding said intake valve in normal position, a plate having a perforated portion and adapted to be held against the face of said barrel with the perforated portion of said plate in registry with the discharge port of said barrel, said plate being adapted to clamp to said barrel a filtering pad inserted between the opposing faces of said barrel and said plate, releasable means for clamping said plate against said barrel, a disc valve extending in all directions beyond the perforated portion of said plate and adapted to make a substantially liquid-tight contact with the outer face thereof at all points about said perforated portion, and yieldable means normally pressing said disc valve against said plate and being adapted to yield to pressure exerted on the liquid by said piston.

3. A liquid sampling and testing device comprising a barrel, and a piston disposed for reciprocation in said barrel, said barrel having its lower end closed and being formed with normally closed intake and discharge ports, in combination with an inwardly opening intake valve controlling and normally closing said intake port, yielding means for holding said intake valve in normal position, a plate having a perforated portion, means for connecting said plate to said barrel for swinging movement, releasable means for holding said plate against swinging movement with relation to said barrel, said plate being adapted to clamp against said barrel an intervening filtering pad, a discharge valve controlling and normally closing said discharge port, and yielding means for normally holding said discharge valve in closed position.

4. A liquid sampling and testing device comprising a barrel, and a piston disposed for reciprocation in said barrel, said barrel having its lower end closed and being formed with normally closed intake and discharge ports, in combination with an inwardly opening intake valve controlling and normally closing said intake port, yielding means for holding said intake valve in normal position, a plate having a perforated portion and adapted to be held against the face of said barrel with the perforated portion of said plate in registry with the discharge port of said barrel, a filtering pad inserted between the opposing faces of said barrel and said plate, an outwardly opening discharge valve controlling and normally closing said discharge port, and yielding means normally holding said discharge valve in closed position.

5. A liquid sampling and testing device comprising a barrel, a piston disposed for reciprocation in said barrel, said barrel having its lower end closed and being formed with normally closed intake and discharge ports, in combination with an inwardly opening intake valve controlling and normally closing said intake port, yielding means for holding said intake valve in normal position, a plate having a perforated portion, releasable means for holding said plate against the face of said barrel, said plate being adapted to clamp against said barrel an interposed filtering pad, and an outwardly opening discharge valve controlling and normally closing said discharge port, said discharge valve being adapted to be moved to open position by pressure exerted by said piston on liquid in said barrel.

6. A liquid sampling and testing device comprising a body having a hollow portion adapted to be inserted in the liquid, said body being formed with intake and discharge ports adapted to establish communication between the interior and exterior of said hollow portion, in combination with means for successively drawing liquid into said body by suction through said intake port and for discharging said liquid from said body through said discharge port by pressure, an inwardly opening intake valve controlling said intake port and normally making a substantially liquid-tight seating contact with the said body, yielding means normally holding said intake valve closed but adapted to yield to suction created within said body, an outwardly opening valve controlling said discharge port, yielding means normally holding said outlet valve closed but adapted to yield to pressure exerted on the liquid in said body, and filtering means interposed in the path of the liquid, between said discharge port and said discharge valve.

7. A liquid sampling and testing device comprising a barrel, a piston disposed for reciprocation in said barrel, said barrel having its lower end closed and being formed with normally closed intake and discharge ports, in combination with an inwardly opening intake valve controlling and normally closing said intake port, a plate having a perforated portion, releasable means for holding said plate against the face of said barrel, said plate being adapted to clamp against said barrel an interposed filtering pad, and an outwardly opening discharge valve controlling and normally closing said discharge port, said discharge valve being adapted to be moved to open position by pressure exerted by said piston on liquid in said barrel.

CHRISTIAN E. BRACKBILL.